United States Patent
Kanehara

(10) Patent No.: US 12,200,341 B2
(45) Date of Patent: Jan. 14, 2025

(54) CONTROL DEVICE, OPERATION METHOD FOR CONTROL DEVICE, AND STORAGE MEDIUM

(71) Applicant: HONDA MOTOR CO., LTD., Tokyo (JP)

(72) Inventor: Akira Kanehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/700,693

(22) Filed: Mar. 22, 2022

(65) Prior Publication Data

US 2022/0311921 A1      Sep. 29, 2022

(30) Foreign Application Priority Data

Mar. 26, 2021   (JP) .................................. 2021-053609

(51) Int. Cl.
*H04N 23/60*      (2023.01)
*H04N 5/262*      (2006.01)
*H04N 7/18*       (2006.01)

(52) U.S. Cl.
CPC ........... *H04N 23/60* (2023.01); *H04N 5/2628* (2013.01); *H04N 7/18* (2013.01)

(58) Field of Classification Search
CPC ......... H04N 5/2628; H04N 7/18; H04N 23/60
USPC ....................................................... 348/148
See application file for complete search history.

(56) References Cited

U.S. PATENT DOCUMENTS

| 10,315,570 B2 | 6/2019 | Wang et al. |
| 11,302,020 B2 | 4/2022 | Matsuo et al. |
| 2004/0085447 A1 | 5/2004 | Katta et al. |
| 2016/0176344 A1 | 6/2016 | Wang et al. |
| 2017/0242442 A1* | 8/2017 | Minster .................... G06T 7/00 |
| 2018/0365859 A1* | 12/2018 | Oba ..................... B60W 40/114 |
| 2019/0258259 A1* | 8/2019 | Yanagihara ....... B60W 30/0953 |
| 2019/0366981 A1* | 12/2019 | Huang ................ B60R 25/252 |
| 2021/0042945 A1 | 2/2021 | Matsuo et al. |

FOREIGN PATENT DOCUMENTS

| CN | 106570842 A | * | 4/2017 | ............ G06T 5/006 |
| JP | H11-348659 A | | 12/1999 | |
| JP | 2008-48443 A | | 2/2008 | |
| JP | 2010-081245 A | | 4/2010 | |
| JP | 2015-035145 A | | 2/2015 | |
| JP | 2020-145612 A | | 9/2020 | |
| WO | 2019/167531 A1 | | 9/2019 | |

OTHER PUBLICATIONS

Related co-pending U.S. Appl. No. 17/700,701.
Office Action dated Dec. 2, 2024, issued in related JP Application No. 2021-052007, with English translation. (6 pages).

* cited by examiner

*Primary Examiner* — John W Miller
*Assistant Examiner* — Omer Khalid
(74) *Attorney, Agent, or Firm* — WHDA, LLP

(57) ABSTRACT

A control device that controls imaging with fisheye cameras disposed on front and rear portions and right and left side portions of a vehicle, the control device comprising: a detection unit configured to detect an orientation of the vehicle; and a control unit configured to control a conversion center position for converting a fisheye image of each of the fisheye cameras into a planar image based on the orientation of the vehicle.

15 Claims, 6 Drawing Sheets

FIG. 2A
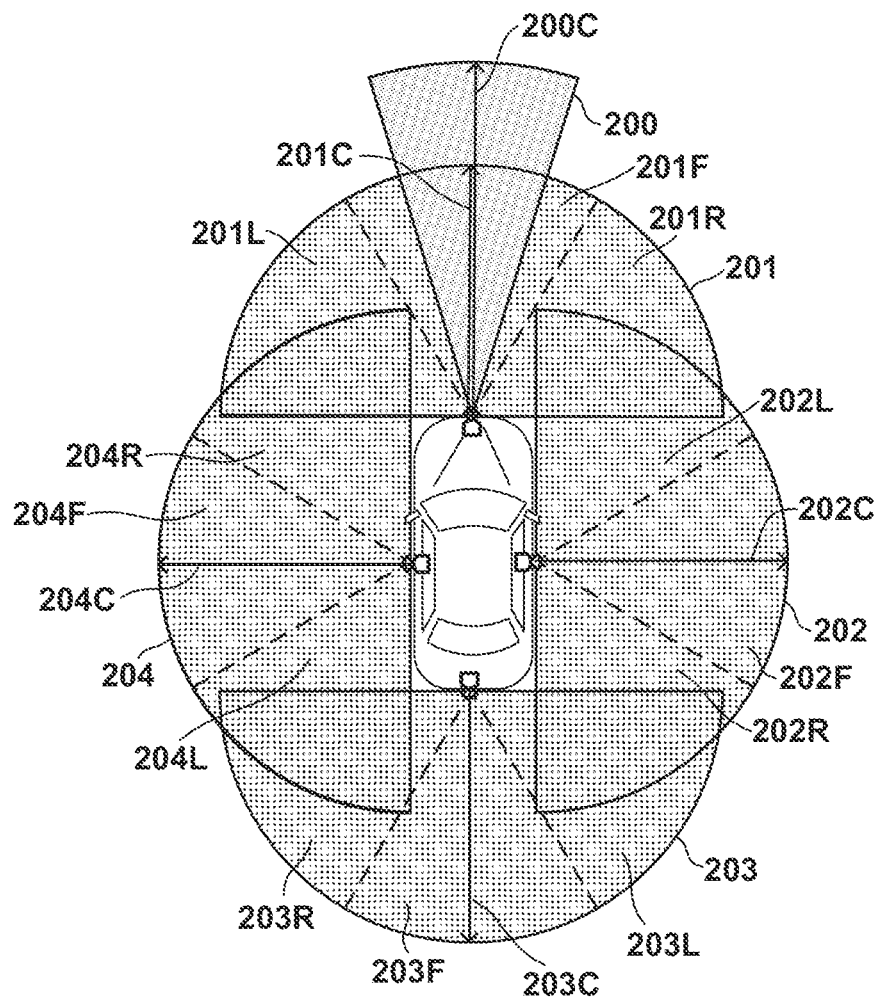
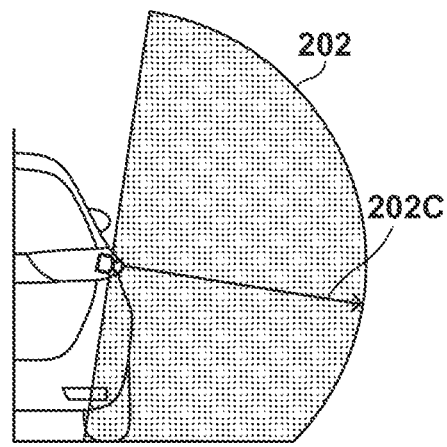
FIG. 2B
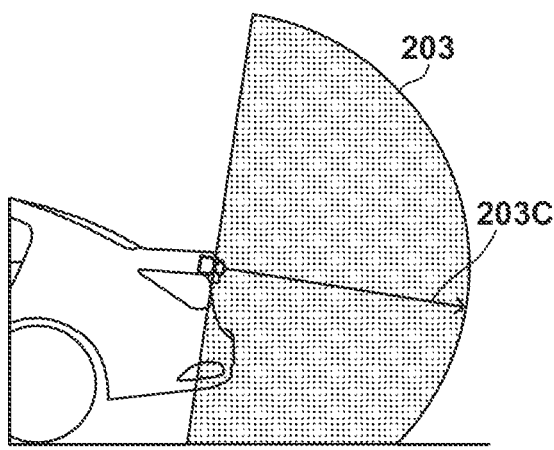
FIG. 2C

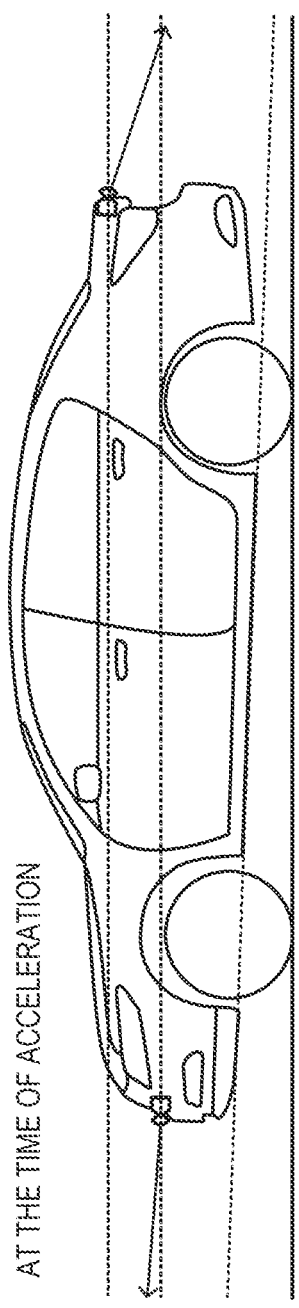
FIG. 4A AT THE TIME OF ACCELERATION
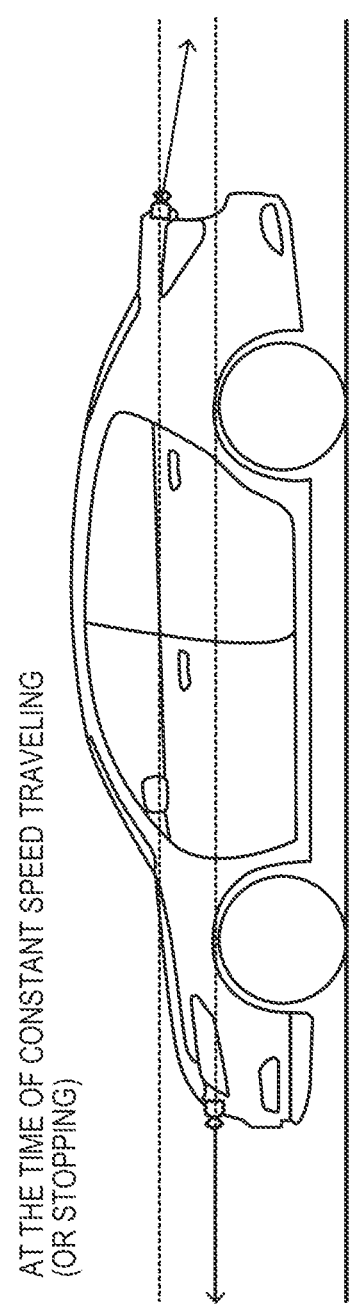
FIG. 4B AT THE TIME OF CONSTANT SPEED TRAVELING (OR STOPPING)
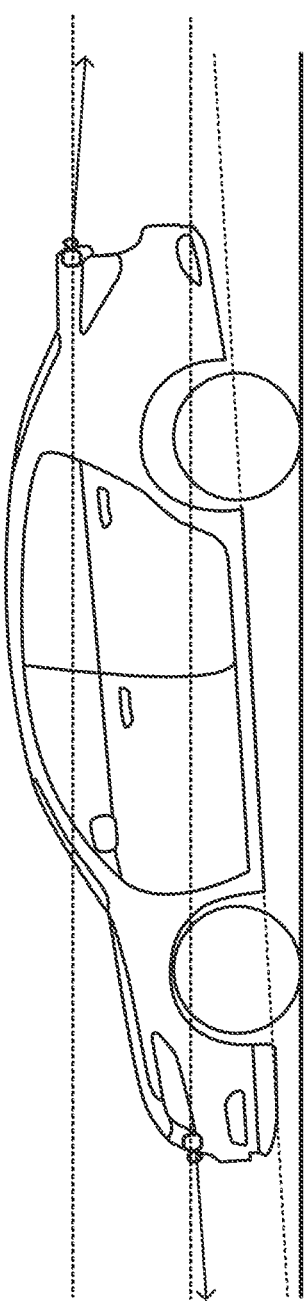
FIG. 4C AT THE TIME OF DECELERATION

CONTROL DEVICE, OPERATION METHOD FOR CONTROL DEVICE, AND STORAGE MEDIUM

CROSS-REFERENCE TO RELATED APPLICATION(S)

This application claims priority to and the benefit of Japanese Patent Application No. 2021-053609 filed on Mar. 26, 2021, the entire disclosure of which is incorporated herein by reference.

BACKGROUND OF THE INVENTION

Field of the Invention

The present invention relates to a control device, an operation method for the control device, and a storage medium.

Description of the Related Art

An object is detected from an image obtained by imaging a periphery of a vehicle and used for control such as driving assistance. At that time, it is also assumed that a fisheye camera having a wide angle of view is used to widen a detection range. However, since the image acquired by the fisheye camera is distorted, detection accuracy may decrease when an object detection technique based on an image without distortion obtained from a normal camera is applied.

Japanese Patent Laid-Open No. 2008-48443 discloses a technique of performing distortion correction processing on a distorted image and performing object detection by using the corrected image.

However, the technique disclosed in Japanese Patent Laid-Open No. 2008-48443 does not take into account any change in an orientation of the vehicle in which the fisheye camera is disposed (for example, the vehicle is tilted to the right side or left side at the time of traveling, or tilted in a front-and-rear direction due to acceleration/deceleration). Therefore, there is a problem that an image in a desired area cannot be acquired.

The present invention has been made in view of the above problem, and the present invention provides a technique for accurately acquiring peripheral information regarding the desired area regardless of an orientation change of the vehicle.

SUMMARY OF THE INVENTION

According to one aspect of the present invention, there is provided a control device that controls imaging with fisheye cameras disposed on front and rear portions and right and left side portions of a vehicle, the control device comprising: a detection unit configured to detect an orientation of the vehicle; and a control unit configured to control a conversion center position for converting a fisheye image of each of the fisheye cameras into a planar image based on the orientation of the vehicle.

BRIEF DESCRIPTION OF THE DRAWINGS

FIG. 2A is a view illustrating an imaging range of each fisheye camera in a horizontal direction;

FIG. 2B is a view illustrating an imaging range of each fisheye camera on a right-side portion in a vertical direction;

FIG. 2C is a view illustrating an imaging range of each fisheye camera on a rear portion in a vertical direction;

FIGS. 4A to 4C are views illustrating an example of an orientation change of a vehicle in a front-and-rear direction according to an embodiment of the present invention;

DESCRIPTION OF THE EMBODIMENTS

Figure 1:
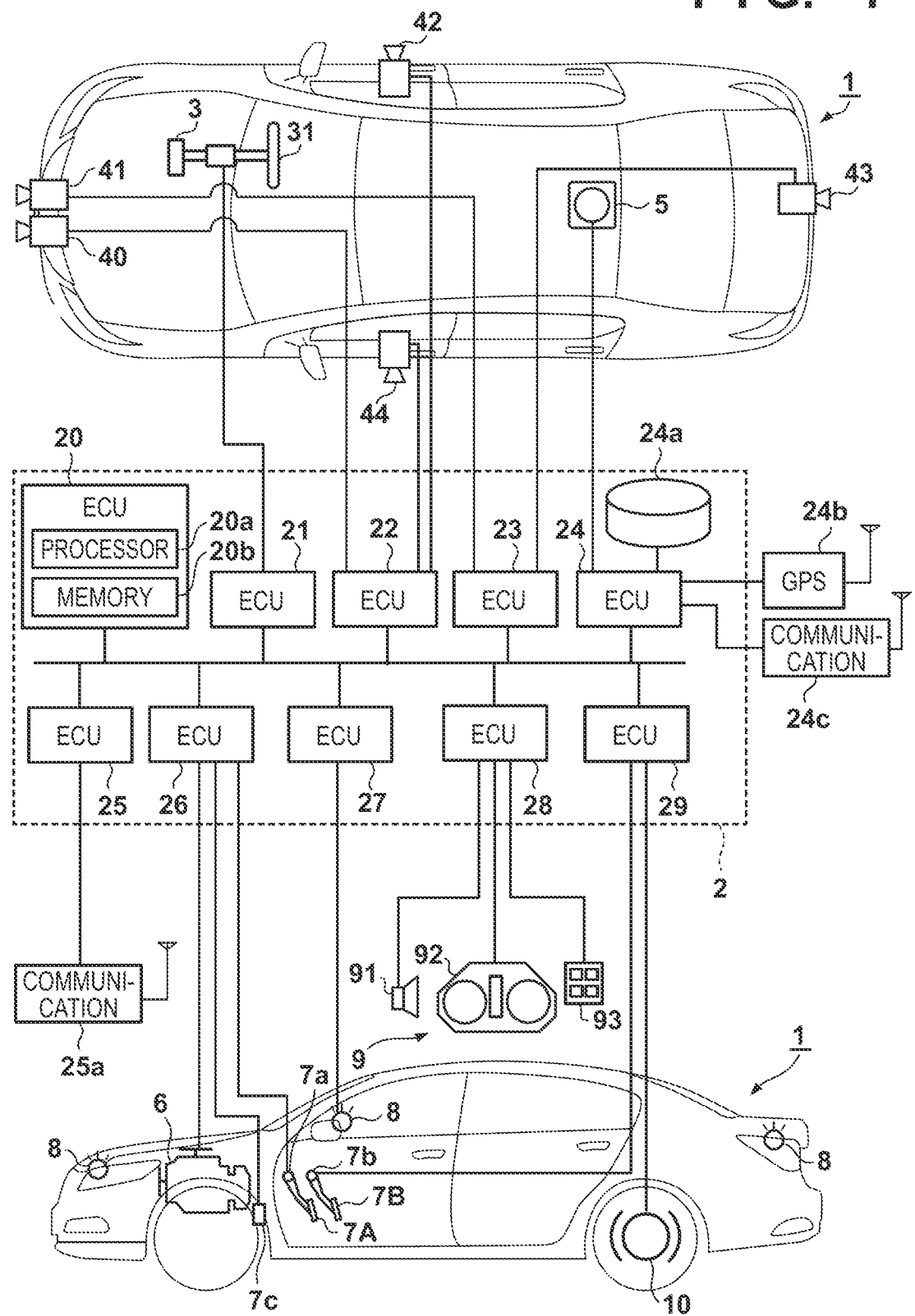
FIG. 1 is a block diagram of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Embodiment

<Configuration>

FIG. 1 is a block diagram of a vehicle 1 according to an embodiment of the present invention. In FIG. 1, the vehicle 1 is schematically illustrated in a plan view and a side view. The vehicle 1 is, for example, a sedan type of four-wheeled passenger vehicle. The vehicle 1 may be such a four-wheeled vehicle, a two-wheeled vehicle, or another type of vehicle.

The vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each of the ECUs includes a processor such as a central processing unit (CPU), a memory such as a semiconductor memory, and an interface with an external device. The memory stores a program executed by the processor, data used by the processor for processing, and the like. Each of the ECUs may include a plurality of processors, memories, and interfaces. For example, the ECU 20 includes one or more processors 20a and one or more memories 20b. Each of the processors 20a executes an instruction including the program stored in each of the memories 20b, so that processing is executed by the ECU 20. Alternatively, the ECU 20 may include a dedicated integrated circuit such as an application specific integrated circuit (ASIC) for executing the processing by the ECU 20. The same applies to the other ECUs.

Hereinafter, functions and the like assigned to each of the ECUs 20 to 29 will be described. Note that the number of ECUs and functions to be handled can be designed as appropriate and can be subdivided or integrated as compared with the present embodiment.

The ECU 20 executes control related to automated traveling of the vehicle 1. In automated driving, at least any one of steering and acceleration/deceleration of the vehicle 1 is automatically controlled. The automated traveling by the ECU 20 may include automated traveling that does not require a traveling operation by a driver (which may also be referred to as automated driving) and automated traveling for assisting the traveling operation by the driver (which may also be referred to as driving assistance).

The ECU 21 controls an electric power steering device 3. The electric power steering device 3 includes a mechanism that steers front wheels according to a driving operation (steering operation) of a driver with respect to a steering wheel 31. Furthermore, the electric power steering device 3 includes a motor that produces driving force for assisting the steering operation and automatically steering the front wheels, and a sensor that detects a steering angle. In a case where a driving state of the vehicle 1 is automated driving, the ECU 21 automatically controls the electric power steering device 3 in response to an instruction from the ECU 20 and controls a traveling direction of the vehicle 1.

The ECUs 22 and 23 control detection units for detecting a peripheral situation of the vehicle and performs information processing on detection results. The vehicle 1 includes one standard camera 40 and four fisheye cameras 41 to 44 as detection units for detecting the peripheral situation of the vehicle. The standard camera 40 and the fisheye cameras 42 and 44 are connected to the ECU 22. The fisheye cameras 41 and 43 are connected to the ECU 23. The ECUs 22 and 23 can extract an outline of a target object or a lane division line (white line or the like) on a road by analyzing images captured by the standard camera 40 and the fisheye cameras 41 to 44.

The fisheye cameras 41 to 44 are cameras provided with a fisheye lens. Hereinafter, a configuration of the fisheye camera 41 will be described. The other fisheye cameras 42 to 44 may have a similar configuration. The angle of view of the fisheye camera 41 is wider than the angle of view of the standard camera 40. Therefore, the fisheye camera 41 can image a wider area than the area of the standard camera 40. The image captured by the fisheye camera 41 has a larger distortion than the image captured by the standard camera 40. Therefore, before analyzing the image captured by the fisheye camera 41, the ECU 23 may perform conversion processing (hereinafter, referred to as "distortion correction processing") for reducing distortion on the image. On the other hand, before analyzing the image captured by the standard camera 40, the ECU 22 may not perform the distortion correction processing on the image. In this manner, the standard camera 40 is an imaging device that captures an image not to be subjected to the distortion correction processing, and the fisheye camera 41 is an imaging device that captures an image to be subjected to the distortion correction processing. Instead of the standard camera 40, any of other imaging devices may be used, which captures an image not to be subjected to the distortion correction processing, for example, a camera attached with a wide-angle lens or a telephoto lens may be used.

The standard camera 40 is attached at a center of a front portion of the vehicle 1 and captures an image of the peripheral situation in front of the vehicle 1. The fisheye camera 41 is attached at the center of the front portion of the vehicle 1 and captures an image of the peripheral situation in front of the vehicle 1. In FIG. 1, the standard camera 40 and the fisheye camera 41 are illustrated as being aligned horizontally. However, the arrangement of the standard camera 40 and the fisheye camera 41 is not limited to this, and for example, the standard camera 40 and the fisheye camera 41 may be aligned vertically. Furthermore, at least one of the standard camera 40 or the fisheye camera 41 may be attached to a front portion of a roof (for example, on a vehicle interior side of a windshield) of the vehicle 1. The fisheye camera 42 is attached at a center of a right-side portion of the vehicle 1 and captures an image of the peripheral situation on the right side of the vehicle 1. The fisheye camera 43 is attached at a center of a rear portion of the vehicle 1 and captures an image of the peripheral situation behind the vehicle 1. The fisheye camera 44 is attached at a center of a left-side portion of the vehicle 1 and captures an image of the peripheral situation on the left side of the vehicle 1.

The types, number, and attachment positions of the cameras provided to the vehicle 1 are not limited to the example described above. Furthermore, the vehicle 1 may include Light Detection and Ranging (LiDAR) or a millimeter-wave radar as a detection unit for detecting the target object around the vehicle 1 and measuring a distance to the target object.

The ECU 22 controls the standard camera 40, and the fisheye cameras 42 and 44, and performs information processing on detection results. The ECU 23 controls the fisheye cameras 41 and 43 and performs information processing on detection results. Reliability of the detection results can be improved by dividing the detection units for detecting the peripheral situation of the vehicle into two systems.

The ECU 24 controls a gyro sensor 5, a GPS sensor 24b, and a communication device 24c, and performs information processing on a detection result or a communication result. The gyro sensor 5 detects a rotational motion of the vehicle 1. A course of the vehicle 1 can be determined based on the detection result of the gyro sensor 5, a wheel speed, and the like. The GPS sensor 24b detects a current location of the vehicle 1. The communication device 24c performs wireless communication with a server that provides map information and traffic information and acquires these pieces of information. The ECU 24 can access a map information database 24a constructed in the memory, and the ECU 24 searches for a route from the current position to a destination. The ECU 24, the map information database 24a, and the GPS sensor 24b constitute a so-called navigation device.

The ECU 25 includes a communication device 25a for vehicle-to-vehicle communication. The communication device 25a performs wireless communication with other surrounding vehicles to exchange information between the vehicles.

The ECU 26 controls a power plant 6. The power plant 6 is a mechanism that outputs a driving force for rotating driving wheels of the vehicle 1 and includes, for example, an engine and a transmission. For example, the ECU 26 controls an output of the engine according to a driving operation (accelerator operation or acceleration operation) of the driver detected by an operation detection sensor 7a provided on an accelerator pedal 7A and switches a gear ratio of the transmission based on information such as a vehicle speed detected by a vehicle speed sensor 7c. In a case where the driving state of the vehicle 1 is automated driving, the ECU 26 automatically controls the power plant 6 in response to the instruction from the ECU 20, and controls the acceleration/deceleration of the vehicle 1.

The ECU 27 controls a lighting device (headlight, taillight, and the like) including a direction indicator 8 (blinker).

In the example of FIG. 1, the direction indicators 8 are provided at the front portion, door mirrors, and the rear portion of the vehicle 1.

The ECU 28 controls an input and output device 9. The input and output device 9 outputs information to the driver and receives an input of information from the driver. A voice output device 91 notifies the driver of information by voice. A display device 92 notifies the driver of information by displaying an image. The display device 92 is disposed, for example, in front of a driver's seat, and constitutes an instrument panel. Note that, although the voice and the image display have been exemplified here, information notification may also be made by using vibration or light. Furthermore, information notification may be made by using a combination of some of voice, display, vibration, and light. Furthermore, the combination or the notification form may be changed in accordance with a level (for example, a degree of urgency) of information notification of which should be made. An input device 93 is a switch group that is disposed at a position where the driver can operate the input device and is used to input an instruction to the vehicle 1. The input device 93 may also include a voice input device.

The ECU 29 controls a brake device 10 and a parking brake (not illustrated). The brake device 10 is, for example, a disc brake device, is provided on each wheel of the vehicle 1, and applies resistance to the rotation of the wheel to decelerate or stop the vehicle 1. The ECU 29 controls, for example, working of the brake device 10 in response to the driver's driving operation (brake operation) that has been detected by an operation detection sensor 7b provided on a brake pedal 7B. In a case where the driving state of the vehicle 1 is automated driving, the ECU 29 automatically controls the brake device 10 in response to the instruction from the ECU 20, and controls the deceleration and stop of the vehicle 1. The brake device 10 and the parking brake also can work to maintain a stopped state of the vehicle 1. Furthermore, in a case where the transmission of the power plant 6 is provided with a parking lock mechanism, the parking lock mechanism also can work to maintain the stopped state of the vehicle 1.

<Imaging Range>

Next, imaging ranges of the standard camera 40 and the fisheye cameras 41 to 44 will be described with reference to FIGS. 2A to 2C. FIG. 2A illustrates a horizontal imaging range of each camera, FIG. 2B illustrates a vertical imaging range of the fisheye camera 42 attached to the right-side portion of the vehicle 1, and FIG. 2C illustrates a vertical imaging range of the fisheye camera 43 attached to the rear portion of the vehicle 1.

First, the imaging range of the vehicle 1 in plan view (for example, in the horizontal direction of the vehicle 1) will be described with reference to FIG. 2A. The standard camera 40 images scenery included in an imaging range 200. An imaging center 200C of the standard camera 40 faces a directly forward side of the vehicle 1. The horizontal angle of view of the standard camera 40 may be less than 90°, for example, may be about 45° or about 30°.

The fisheye camera 41 images scenery included in an imaging range 201. An imaging center 201C of the fisheye camera 41 faces the directly forward side of the vehicle 1. The fisheye camera 42 images scenery included in an imaging range 202. An imaging center 202C of the fisheye camera 42 faces a directly right side of the vehicle 1. The fisheye camera 43 images scenery included in an imaging range 203. An imaging center 203C of the fisheye camera 43 faces a directly rear side of the vehicle 1. The fisheye camera 44 images scenery included in an imaging range 204. An imaging center 204C of the fisheye camera 44 faces a directly left side of the vehicle 1. The horizontal angles of view of the fisheye cameras 41 to 44 may be, for example greater than 90°, greater than 150°, or greater than 180°, and for example may be about 180°. FIG. 2A illustrates an example in which the horizontal angles of view of the fisheye cameras 41 to 44 is 180°.

The imaging range 201 can be divided into an area 201L on a diagonally forward left side of the vehicle 1, an area 201F on a directly forward side of the vehicle 1, and an area 201R on a diagonally forward right side of the vehicle 1. The imaging range 202 can be divided into an area 202L on a diagonally forward right side of the vehicle 1, an area 202F on a directly right side of the vehicle 1, and an area 202R on a diagonally rearward right side of the vehicle 1. The imaging range 203 can be divided into an area 203L on a diagonally rearward right side of the vehicle 1, an area 203F on a directly rear side of the vehicle 1, and an area 203R on a diagonally rearward left side of the vehicle 1. The imaging range 204 can be divided into an area 204L on a diagonally rearward left side of the vehicle 1, an area 204F on a directly left side of the vehicle 1, and an area 204R on a diagonally forward left side of the vehicle 1. The imaging range 201 may be equally divided into the three areas 201L, 201F, and 201R (that is, the angles of views of the respective areas are made equal to one another). The other imaging ranges 202 to 204 may also be each divided equally into three areas.

The standard camera 40 and the fisheye cameras 41 to 44 have the imaging ranges 200 to 204 as described above, so that the directly forward direction and the four oblique directions of the vehicle 1 are included in the imaging ranges of the two individual cameras. Specifically, the directly forward side of the vehicle 1 is included in both the imaging range 200 of the standard camera 40 and the area 201F of the imaging range 201 of the fisheye camera 41. The diagonally forward right side of the vehicle 1 is included in both the area 201R of the imaging range 201 of the fisheye camera 41 and the area 202L of the imaging range 202 of the fisheye camera 42. The same applies to the other three oblique directions of the vehicle 1.

Next, a vertical imaging range of the vehicle 1 will be described with reference to FIGS. 2B and 2C. In FIG. 2B, the vertical imaging range of the fisheye camera 42 will be described, and in FIG. 2C, the vertical imaging range of the fisheye camera 43 will be described. The same may apply to the vertical imaging ranges of the other fisheye cameras 41 and 44.

The vertical angles of view of the fisheye cameras 41 to 44 may be, for example, greater than 90°, greater than 150°, or greater than 180°, and for example, may be about 180°. FIGS. 2B and 2C illustrate an example in which the vertical angle of view of the fisheye cameras 41 to 44 is 180°. In the illustrated example, the imaging center 203C of the fisheye camera 43 faces a lower side than a direction parallel to the ground (toward the ground side). Instead of this, the imaging center 203C of the fisheye camera 43 may face a direction parallel to the ground, or may face an upper side than the direction parallel to the ground (an opposite side of the ground). Furthermore, the imaging centers 201C to 204C of the fisheye cameras 41 to 44 may face different directions from one another in the vertical direction.

The distortion correction processing of the images captured by the fisheye cameras 41 to 44 will be described with reference to FIG. 3. An image 300 is an image of scenery on the rightward side of the vehicle 1 captured by the fisheye camera 42. As illustrated, the image 300 has a significant distortion particularly in a peripheral portion.

The ECU 22 connected to the fisheye camera 42 performs distortion correction processing on the image 300 (processing of converting the fisheye image into a planar image). Specifically, the ECU 22 sets one point in the image 300 as a correction center point 301. The ECU 22 cuts out a rectangular area 302 centered on the correction center point 301 from the image 300. The ECU 22 generates an image 303 in which the distortion is reduced by performing the distortion correction processing on the area 302. In the distortion correction processing, the closer a position is to the correction center point 301, the more the distortion is reduced, and at a position far from the correction center point 301, the distortion is not reduced or the distortion is increased. Therefore, in some embodiments, the ECU 22 sets the correction center point 301 in an area desired to focus on in the surrounding environment of the vehicle 1, and generates an image in which the distortion is reduced for such an area.

Figure 3:
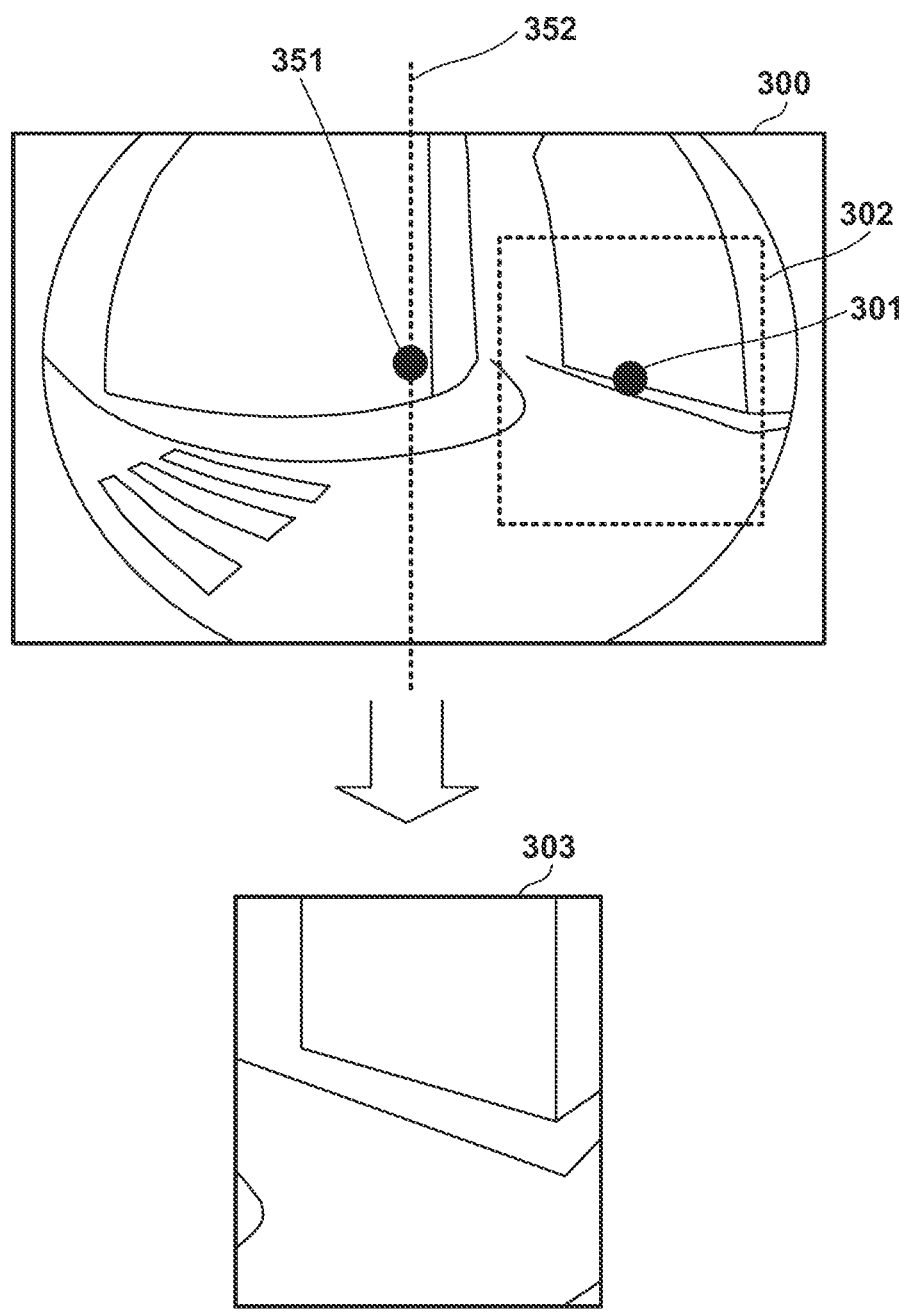
FIG. 3 is an explanatory diagram of distortion correction processing of a fisheye image.

Note that, in the example of FIG. 3, the correction center point 301 and the rectangular area 302 are set on the right side of (a vertical line 352 passing through) the imaging center 351 of the fisheye image, but the correction center point 301 and the rectangular area 302 may be set on the left side, or both imaging center 351 of the fisheye image and the correction center point 301 may be set on the line 352.

<Orientation Change of Vehicle>

The orientation of the vehicle 1 is changed depending on the acceleration/deceleration at the time of traveling. FIGS. 4A to 4C are views illustrating an example of the orientation of the vehicle 1 in the acceleration/deceleration in the traveling direction. FIG. 4A illustrates the orientation of the vehicle 1 during acceleration, FIG. 4B illustrates the orientation of the vehicle 1 at the time of constant speed traveling or stopping, and FIG. 4C illustrates the orientation of the vehicle 1 at the time of deceleration.

First, as illustrated in FIG. 4B, the fisheye camera 41 and the fisheye camera 43 disposed in the front-and-rear direction of the vehicle 1 face a predetermined imaging direction (imaging center) at the time of the constant speed traveling or the stopping.

At the time of the acceleration, as illustrated in FIG. 4A, a front position of the vehicle 1 is lifted vertically upward by the acceleration, and a rear position of the vehicle 1 is lowered vertically downward by the acceleration. Accordingly, the imaging direction (imaging center) of the fisheye camera 41 disposed on the front portion of the vehicle 1 is changed upward as compared with the horizontal state of the vehicle 1. Furthermore, the imaging direction (imaging center) of the fisheye camera 43 disposed on the rear portion of the vehicle 1 is changed downward as compared with the horizontal state of the vehicle 1.

On the other hand, at the time of the deceleration, as illustrated in FIG. 4C, the front position of the vehicle 1 is lowered vertically downward by the deceleration and the rear position of the vehicle 1 is lifted vertically upward by the deceleration. Accordingly, the imaging direction (imaging center) of the fisheye camera 41 disposed on the front portion of the vehicle 1 is changed downward as compared with the horizontal state of the vehicle 1. Furthermore, the imaging direction (imaging center) of the fisheye camera 43 disposed on the rear portion of the vehicle 1 is changed upward as compared with the horizontal state of the vehicle 1.

Figure 5A:
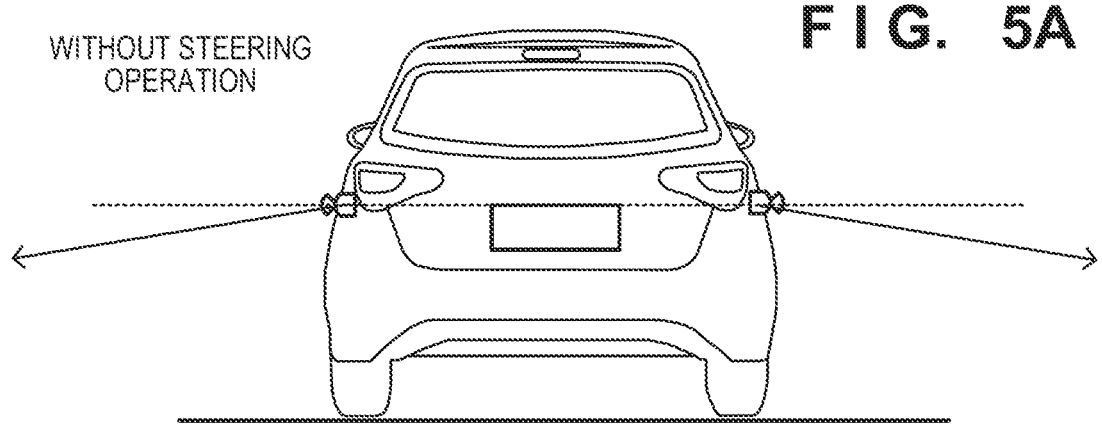
FIGS. 5A to 5C are views illustrating an example of an orientation change of a vehicle in a right-and-left direction according to an embodiment of the present invention.
Figure 5B:
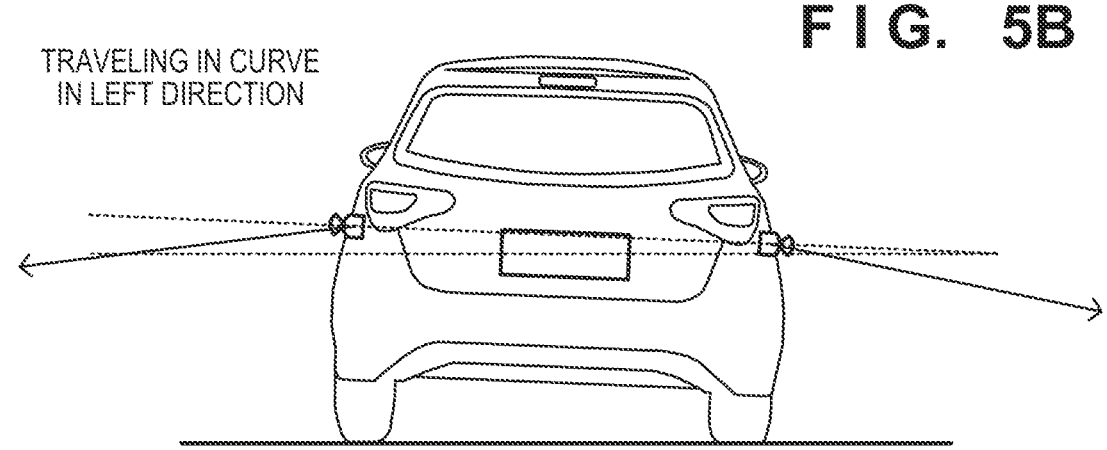
Figure 5C:
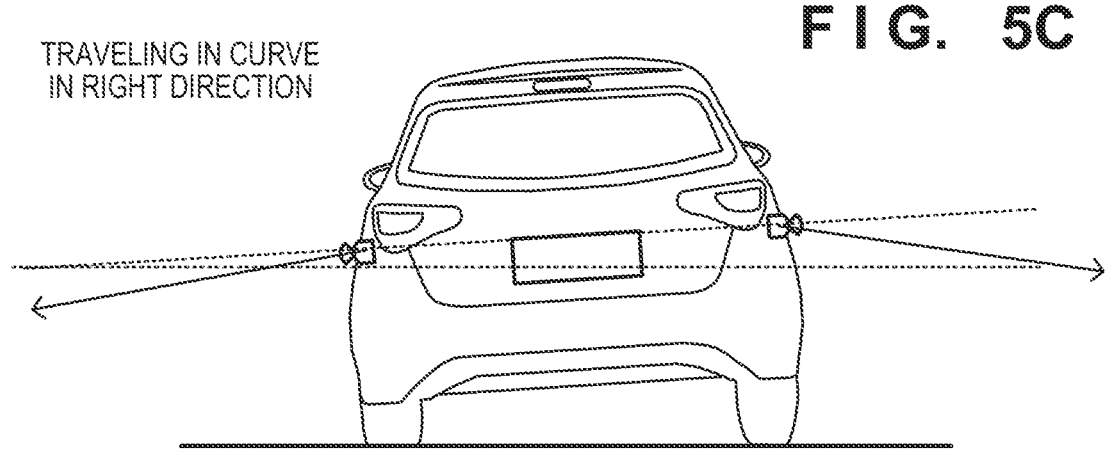

Furthermore, the orientation of the vehicle 1 is also changed by steering (lateral acceleration) at the time of traveling. Specifically, acceleration is generated in the right-and-left direction (lateral direction) according to a speed of the vehicle 1 and a steering amount of the steering wheel 31. FIGS. 5A to 5C are views illustrating an example of the orientation of the vehicle 1 at the time of steering. FIG. 5A illustrates the orientation of the vehicle 1 at the time of constant speed traveling or stopping without a steering operation, FIG. 5B illustrates the orientation of the vehicle 1 during the steering operation in a left direction, and FIG. 5C illustrates the orientation of the vehicle 1 during the steering operation in a right direction.

At the time of steering in the left direction such as curving to the left (when the steering wheel 31 is operated counterclockwise), the acceleration is generated in the right direction, and as illustrated in FIG. 5B, a left side position of the vehicle 1 is lifted vertically upward by the steering, and a right side position of the vehicle 1 is lowered vertically downward by the steering. Accordingly, the imaging direction (imaging center) of the fisheye camera 44 disposed on the left side of the vehicle 1 is changed upward as compared with the horizontal state of the vehicle 1. Furthermore, the imaging direction (imaging center) of the fisheye camera 42 disposed on the right side of the vehicle 1 is changed downward as compared with the horizontal state of the vehicle 1.

On the other hand, at the time of steering in the right direction such as curving to the right (when the steering wheel 31 is operated clockwise), the acceleration is generated in the left direction, and as illustrated in FIG. 5C, the right side position of the vehicle 1 is lifted vertically upward by the steering, and the left side position of the vehicle 1 is lowered vertically downward by the steering. Accordingly, the imaging direction (imaging center) of the fisheye camera 42 disposed on the right side of the vehicle 1 is changed upward as compared with the horizontal state of the vehicle 1. Furthermore, the imaging direction (imaging center) of the fisheye camera 44 disposed on the left side of the vehicle 1 is changed downward as compared with the horizontal state of the vehicle 1.

In this manner, since the orientation of the vehicle 1 is changed by the acceleration/deceleration and the steering of the vehicle 1, an acquisition range of the peripheral information is changed. In the present embodiment, each conversion center position for converting the fisheye image captured by each fisheye camera into the planar image is corrected according to the orientation of the vehicle 1.

For example, a change in the orientation of the vehicle 1 according to the acceleration and deceleration at the time of the acceleration/deceleration (how much the imaging direction (imaging center) is changed) is held in advance as table data or a function, and the current acceleration or the current deceleration is acquired, so that it is possible to estimate how the orientation of the vehicle 1 is changed.

Similarly, a change in the orientation of the vehicle 1 according to the lateral acceleration at the time of the steering (how much the imaging direction (imaging center) is changed) is held in advance as table data or a function, and the current acceleration in the lateral direction is acquired, so that it is possible to estimate how the orientation of the vehicle 1 is changed. The lateral acceleration can be calculated based on, for example, the speed of the vehicle 1 and the steering amount.

As described above, by correcting the conversion center position for converting the fisheye image into the planar image according to the orientation of the vehicle 1, it is possible to correct influence of the orientation change of the vehicle 1, and it is possible to acquire desired peripheral information with high accuracy.

<Processing>

Figure 6:
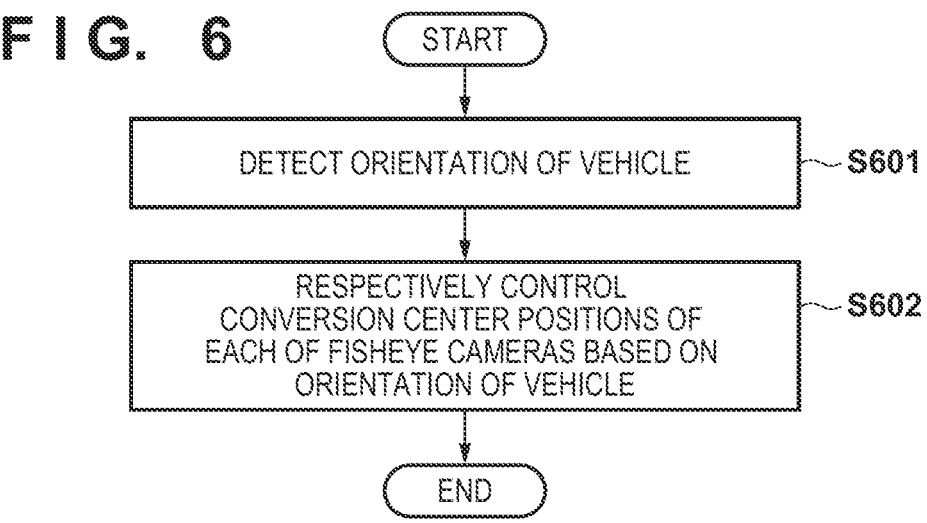
FIG. 6 is a flowchart illustrating a procedure of processing executed by a control device according to an embodiment of the present invention.

Next, a procedure of processing performed by the control device 2 according to the present embodiment will be described with reference to a flowchart of FIG. 6.

In S601, the ECU 22 and the ECU 23 detect the orientation of the vehicle 1. Various methods can be applied as the orientation detection method. For example, the acceleration and deceleration of the vehicle 1 are calculated based on the change in the speed of the vehicle 1 detected by the vehicle speed sensor 7c, and the calculated acceleration or deceleration and the orientation of the vehicle 1 at that time are held in advance as the table data or the function. It is possible to detect the orientation by calculating the orientation of the corresponding vehicle 1 according to the current acceleration or deceleration of the vehicle 1. Similarly, the lateral acceleration of the vehicle 1 is calculated based on the speed of the vehicle 1 and the steering amount of the steering wheel 31, and the calculated lateral acceleration and the orientation of the vehicle 1 at that time are held in advance as the table data or the function. It is possible to detect the orientation by calculating the orientation of the corresponding vehicle 1 according to the current lateral acceleration of the vehicle 1. Alternatively, the orientation of the vehicle 1 may be detected from the detection result of the gyro sensor 5.

In S602, the ECU 22 and the ECU 23 respectively control the conversion center positions for converting the fisheye image of each fisheye camera (fisheye cameras 41 to 44) into the planar image based on the orientation of the vehicle 1. For example, by storing a relationship between the orientation of the vehicle 1 and the conversion center position in association with each other in advance, it is possible to derive the conversion center position according to the orientation. Various cases of the processing of S602 will be described below.

[Control Example at Time of Braking (Deceleration)]

<Fisheye Camera 41>

First, a control example at the time of acceleration will be described. For example, in S602, at the time of the orientation change in which the front portion of the vehicle 1 is moved downward and the rear portion of the vehicle 1 is moved upward (at the time of braking (deceleration)), the ECU 23 sets the conversion center position of the fisheye camera 41, which is disposed on the front portion of the vehicle 1 and captures a forward image of the vehicle 1, to a position above a predetermined position (conversion center position when the vehicle 1 is in the horizontal state) based on an orientation after the orientation change. Since the front portion of the vehicle 1 is lowered, the imaging center of the fisheye camera 41 faces downward as compared with the horizontal state, but the direction in which the peripheral information is desired to be acquired is upward. Therefore, the conversion center position is corrected upward by the extent that the front portion of the vehicle 1 is lowered. In the case of large deceleration, the front portion of the vehicle 1 is also significantly lowered, and thus the conversion center position is corrected to be higher according to this.

<Fisheye Camera 43>

Moreover, the ECU 23 sets the conversion center position of the fisheye camera 43, which is disposed on the rear portion of the vehicle 1 and captures a rearward image of the vehicle 1, to a position below a predetermined position (conversion center position when the vehicle 1 is in the horizontal state). Since the rear portion of the vehicle 1 is lifted, the imaging center of the fisheye camera 43 faces upward as compared with the horizontal state, but the direction in which the peripheral information is desired to be acquired is downward. Therefore, the conversion center position is corrected upward by the extent that the rear portion of the vehicle 1 is lifted. In the case of large deceleration, the rear portion of the vehicle 1 is also significantly lifted, and thus the conversion center position is corrected to be lower according to this.

<Fisheye Cameras 42 and 44>

Furthermore, at the time of the orientation change in which the front portion of the vehicle 1 is moved downward and the rear portion of the vehicle 1 is moved upward (at the time of braking (deceleration)), the ECU 22 corrects the conversion center position of the fisheye camera 42, which is disposed on the right-side portion of the vehicle 1 and captures a rightward image of the vehicle 1, by rotating the conversion center position clockwise around the imaging center of the fisheye camera 42 based on an orientation after the orientation change. On the other hand, at the time of the orientation change in which the front portion of the vehicle 1 is moved downward and the rear portion of the vehicle 1 is moved upward (at the time of braking (deceleration)), the ECU 22 corrects the conversion center position of the fisheye camera 44, which is disposed on the left-side portion of the vehicle 1 and captures a leftward image of the vehicle 1, by rotating the conversion center position counterclockwise around the imaging center of the fisheye camera 44 based on an orientation after the orientation change.

Figure 7A:
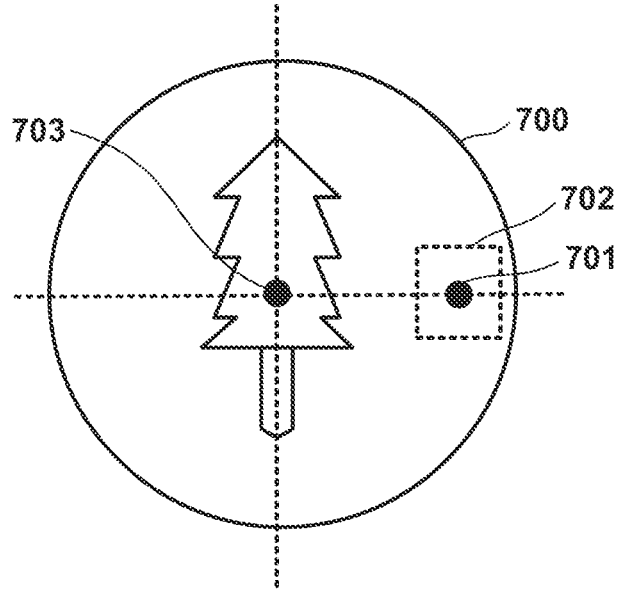
FIGS. 7A and 7B are views illustrating an example of rotation correction according to an embodiment of the present invention.
Figure 7B:
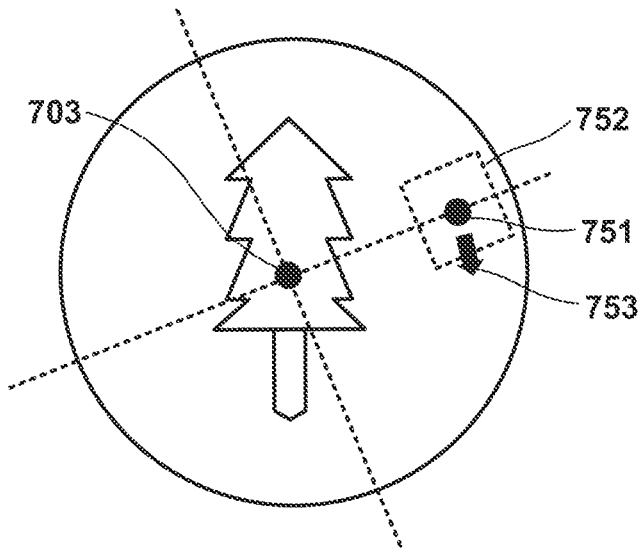

Here, FIG. 7A is an example of the fisheye image (imaging center 703) of the fisheye camera 42 that captures the rightward image in the horizontal state in which the acceleration/deceleration or the lateral acceleration is not be generated. A rectangular area 702 centered on a correction center point 701 is set. At the time of the orientation change in which the front portion of the vehicle 1 is moved downward and the rear portion of the vehicle 1 is moved upward (at the time of braking (deceleration)), a correction center point 751 and a rectangular area 752 are rotated to be changed in position as illustrated in FIG. 7B, and in the illustrated example, the peripheral information is acquired from an area above a position in which the peripheral information is originally desired to be acquired. In order to correct this, the conversion center position is corrected by rotating the conversion center position clockwise around the imaging center 703 as indicated by an arrow 753. Since the conversion center position of the fisheye camera 44 disposed on the left-side portion of the vehicle 1 and capturing the leftward image of the vehicle 1 is rotationally changed in the opposite direction, the opposite rotation correction is performed.

According to this, the peripheral information of a position originally desired to be acquired can be acquired with high accuracy.

[Control Example at Time of Acceleration]

Next, a control example at the time of acceleration will be described. At the time of the acceleration, the front portion of the vehicle 1 is lifted and the rear portion of the vehicle 1 is lowered unlike the time of the deceleration. Therefore, the conversion center position is corrected in a direction opposite to that at the time of the deceleration. The correction can be performed by a method similar to that at the time of the deceleration.

For example, in S602, at the time of the orientation change in which the front portion of the vehicle 1 is moved upward and the rear portion of the vehicle 1 is moved downward (at the time of acceleration), the ECU 23 sets the conversion center position of the fisheye camera 41, which is disposed on the front portion of the vehicle 1 and captures the forward image of the vehicle 1, to a position below a predetermined position (conversion center position when the vehicle 1 is in the horizontal state) based on an orientation after the orientation change. Furthermore, the ECU 23 sets the conversion center position of the fisheye camera 43, which is disposed on the rear portion of the vehicle 1 and captures the rearward image of the vehicle 1, to a position above a predetermined position (conversion center position when the vehicle 1 is in the horizontal state).

In the orientation change state in which the front portion of the vehicle 1 is moved upward and the rear portion of the vehicle 1 is moved downward (for example, a state of being tilted to the rear side at the time of acceleration), the ECU 22 corrects the conversion center position of the fisheye camera 42, which is disposed on the right-side portion of the vehicle 1 and captures the rightward image of the vehicle 1, by rotating the conversion center position counterclockwise around the imaging center of the fisheye camera 42 based on an orientation after the orientation change. Furthermore, at the time of the orientation change in which the front portion of the vehicle 1 is moved upward and the rear portion of the vehicle 1 is moved downward (at the time of acceleration), the ECU 22 corrects the conversion center position of the fisheye camera 44, which is disposed on the left-side portion of the vehicle 1 and captures the leftward image of the vehicle 1, by rotating the conversion center position clockwise around the imaging center of the fisheye camera 44 based on an orientation after the orientation change.

According to this, the peripheral information of a position originally desired to be acquired can be acquired with high accuracy.

[Control Example in Case where Lateral Acceleration is Generated]

In addition to the acceleration/deceleration, the acceleration is generated in the lateral direction by steering during traveling such as traveling in a curve, the left-side portion of the vehicle 1 is lowered while the right-side portion of the vehicle 1 is lifted (tilted to the left side), and the right-side portion of the vehicle 1 is lowered while the left-side portion of the vehicle 1 is lifted (tilted to the right side). For example, an acceleration is generated in the right direction by steering when the vehicle travels in a left curve, and the vehicle 1 is tilted to the right side. On the other hand, acceleration is generated in the left direction by steering when the vehicle travels in a right curve, and the vehicle 1 is tilted to the left side.

First, a control example in a case where the orientation of the vehicle 1 is tilted to the right side will be described.

<Fisheye Cameras 42 and 44>

For example, in S602, in the orientation change state in which the right portion of the vehicle 1 is moved downward and the left portion of the vehicle 1 is moved upward (state of being tilted to the right side), the ECU 22 changes the conversion center position of the fisheye camera 42, which is disposed on the right-side portion of the vehicle 1 and captures the rightward image of the vehicle 1, to a position above a predetermined position (conversion center position when the vehicle 1 is in the horizontal state) based on an orientation after the orientation change. In a case where the vehicle 1 is tilted to the right side, since the conversion center position of the fisheye camera 42 capturing the rightward image is directed downward from the area in which the peripheral information is originally desired to be acquired, the change is corrected upward.

In the orientation change state in which the right portion of the vehicle 1 is moved downward and the left portion of the vehicle 1 is moved upward (state of being tilted to the right side), the ECU 22 changes the conversion center position of the fisheye camera 44, which is disposed on the left-side portion of the vehicle 1 and captures the leftward image of the vehicle 1, to a position below a predetermined position (conversion center position when the vehicle 1 is in the horizontal state) based on an orientation after the orientation change. In a case where the vehicle 1 is tilted to the right side, since the conversion center position of the fisheye camera 42 capturing the leftward image is directed upward from the area in which the peripheral information is originally desired to be acquired, the change is corrected downward.

<Fisheye Cameras 41 and 43>

In the orientation change state in which the right portion of the vehicle 1 is moved downward and the left portion of the vehicle 1 is moved upward (state of being tilted to the right side), the ECU 23 corrects the conversion center position of the fisheye camera 41, which is disposed on the front portion of the vehicle 1 and captures the forward image of the vehicle 1, by rotating the conversion center position counterclockwise around the imaging center of the fisheye camera 41 based on an orientation after the orientation change. Furthermore, in the orientation change state in which the right portion of the vehicle 1 is moved downward and the left portion of the vehicle 1 is moved upward (state of being tilted to the right side), the ECU 23 corrects the conversion center position of the fisheye camera 43, which is disposed on the rear portion of the vehicle 1 and captures the rearward image of the vehicle 1, by rotating the conversion center position clockwise around the imaging center of the fisheye camera 43 based on an orientation after the orientation change.

In a case where the vehicle 1 is tilted to the right side, since the conversion center position of the fisheye camera 41 capturing the forward image is rotated clockwise, the conversion center position is corrected by being rotated counterclockwise by the extent of the change of the rotation. Similarly, in a case where the vehicle 1 is tilted to the right side, since the conversion center position of the fisheye camera 43 capturing the rearward image is rotated counterclockwise, the conversion center position is corrected by being rotated clockwise by the extent of the change of the rotation.

Next, a control example in a case where the orientation of the vehicle 1 is tilted to the left side will be described. This control example is a reverse processing of the control example in a case where the orientation of the vehicle 1 is tilted to the right side.

<Fisheye Cameras 42 and 44>

For example, in S602, in the orientation change state in which the right portion of the vehicle 1 is moved upward and the left portion of the vehicle 1 is moved downward (state of being tilted to the left side), the ECU 22 changes the conversion center position of the fisheye camera 42, which is disposed on the right-side portion of the vehicle 1 and captures the rightward image of the vehicle 1, to a position below a predetermined position (conversion center position when the vehicle 1 is in the horizontal state) based on an orientation after the orientation change. In a case where the vehicle 1 is tilted to the left side, since the conversion center position of the fisheye camera 42 capturing the rightward image is directed upward from the area in which the peripheral information is originally desired to be acquired, the change is corrected downward.

In the orientation change state in which the right portion of the vehicle 1 is moved upward and the left portion of the vehicle 1 is moved downward (state of being tilted to the left side), the ECU 22 changes the conversion center position of the fisheye camera 44, which is disposed on the left-side portion of the vehicle 1 and captures the leftward image of the vehicle 1, to a position above a predetermined position (conversion center position when the vehicle 1 is in the horizontal state) based on an orientation after the orientation change. In a case where the vehicle 1 is tilted to the left side, since the conversion center position of the fisheye camera 42 capturing the leftward image is directed downward from the area in which the peripheral information is originally desired to be acquired, the change is corrected upward.

<Fisheye Cameras 41 and 43>

In the orientation change state in which the right portion of the vehicle 1 is moved upward and the left portion of the vehicle 1 is moved downward (state of being tilted to the left side), the ECU 23 corrects the conversion center position of the fisheye camera 41, which is disposed on the front portion of the vehicle 1 and captures the forward image of the vehicle 1, by rotating the conversion center position clockwise around the imaging center of the fisheye camera 41 based on an orientation after the orientation change. Furthermore, in the orientation change state in which the right portion of the vehicle 1 is moved upward and the left portion of the vehicle 1 is moved downward (state of being tilted to the left side), the ECU 23 corrects the conversion center position of the fisheye camera 43, which is disposed on the rear portion of the vehicle 1 and captures the rearward image of the vehicle 1, by rotating the conversion center position counterclockwise around the imaging center of the fisheye camera 43 based on an orientation after the orientation change.

In a case where the vehicle 1 is tilted to the left side, since the conversion center position of the fisheye camera 41 capturing the forward image is rotated counterclockwise, the conversion center position is corrected by being rotated clockwise by the extent of the change of the rotation. Similarly, in a case where the vehicle 1 is tilted to the left side, since the conversion center position of the fisheye camera 43 capturing the rearward image is rotated clockwise, the conversion center position is corrected by being rotated counterclockwise by the extent of the change of the rotation.

As described above, various types of processing have been described in accordance with the orientation change of the vehicle 1, for example, at the time of acceleration, at the time of deceleration, and at the time of lateral acceleration. However, some of these types of processing may be executed in combination. For example, in a case where the vehicle travels in a left curve while decelerating, both a change in height of the front portion and the rear portion of the vehicle 1 and a change in height of the left portion and the right portion of the vehicle 1 occur. Therefore, processing corresponding to each change may be executed together.

Image conversion from the fisheye image to the planar image is executed based on the conversion center position set (corrected) in S602, and various operations such as acquisition of the peripheral information and driving assistance are executed by using the converted planar image. Accordingly, the series of processing in FIG. 6 is ended.

As described above, in the present embodiment, the conversion center position for converting the fisheye images of the fisheye cameras disposed at the front portion, the rear portion, and the left and right side portions of the vehicle into the planar images is controlled based on the orientation of the vehicle.

As a result, it is possible to accurately acquire the peripheral information regarding a desired area regardless of the orientation change of the vehicle. Therefore, various processing such as driving assistance and automated driving using the acquired peripheral information can also be executed with high accuracy.

Modifications

An image conversion frequency of each of the fisheye cameras 42 and 44 disposed on the right and left sides of the vehicle 1 may be controlled to be lower than the image conversion frequency of each of the fisheye cameras 41 and 43 disposed on the front and rear sides of the vehicle 1. For example, in a case where a vehicle is traveling on a single-lane road on one side or a lane change is not performed, a change in environment (peripheral information) in the front-and-rear direction often affects driving more than a change in environment (peripheral information) in the right-and-left direction. Therefore, by increasing the image conversion frequency (image acquisition frequency) in the front-and-rear direction rather than the right-and-left direction, more accurate information can be acquired in a timely manner, and by suppressing the image conversion frequency in the right-and-left direction, a processing load can be reduced.

Furthermore, in the embodiment described above, an example in which the ECU 22 and the ECU 23 perform processing separately has been described. However, these may be configured as a single ECU, and the single ECU may execute the processing of the embodiment described above or the modification.

Furthermore, a shape, a position, and a size of the rectangular area for the cutting out described in the embodiment are merely examples, and are not limited to the illustrated examples. A rectangular area having a larger size than the illustrated rectangular area may be used, or a rectangular area having a smaller size may be used.

Other Embodiments

Furthermore, a program for implementing one or more functions described in the embodiments is supplied to a system or apparatus through a network or a storage medium, and one or more processors in a computer of the system or apparatus can read and execute the program. The present invention is also achievable by such an aspect.

The invention is not limited to the foregoing embodiments, and various variations/changes are possible within the spirit of the invention.

Summary of Embodiments

According to a first aspect, there is provided a control device (for example, 2) that controls imaging with fisheye cameras (41 to 44) disposed on front and rear portions and right and left side portions of a vehicle (for example, 1), the control device including:
- a detection unit (for example, 22, 23, 5, and 7*c*) configured to detect an orientation of the vehicle; and
- a control unit (for example, 22) configured to control a conversion center position (for example, 301, 701, and 751) for converting a fisheye image of each of the fisheye cameras into a planar image based on the orientation of the vehicle.

As a result, it is possible to accurately acquire the peripheral information regarding a desired area regardless of the orientation change of the vehicle. Therefore, various processing such as driving assistance and automated driving using the acquired peripheral information can also be executed with high accuracy.

In the control device (for example, 2) according to a second aspect, the control unit sets the conversion center position of a first fisheye camera (for example, 41), which is disposed on the front portion of the vehicle and captures a forward image of the vehicle, to a position above a predetermined position (for example, a position when the vehicle is in a horizontal state), based on an orientation change state in which the front portion of the vehicle is moved downward and the rear portion of the vehicle is moved upward (for example, state of being tilted to the front side at the time of deceleration).

According to this, it is possible to reduce influence of the orientation change in the front-and-rear direction and accurately acquire peripheral information of a desired area for the fisheye camera that captures the forward image.

In the control device (for example, 2) according to a third aspect, the control unit sets the conversion center position of a second fisheye camera (for example, 43), which is disposed on the rear portion of the vehicle and captures a rearward image of the vehicle, to a position below a predetermined position (for example, a position when the vehicle is in the horizontal state), based on an orientation change state in which the front portion of the vehicle is moved downward and the rear portion of the vehicle is moved upward (for example, a state of being tilted to the front side at the time of deceleration).

According to this, it is possible to reduce influence of the orientation change in the front-and-rear direction and accurately acquire peripheral information of a desired area for the fisheye camera that captures the rearward image.

In the control device (for example, 2) according to a fourth aspect, based on an orientation change state in which the front portion of the vehicle is moved downward and the rear portion of the vehicle is moved upward (for example, a state of being tilted to the front side at the time of deceleration), the control unit corrects the conversion center position of a third fisheye camera (for example, 42), which is disposed on the right-side portion of the vehicle and captures a rightward image of the vehicle, by rotating the conversion center position clockwise around an imaging center of the third fisheye camera, and corrects the conversion center position of a fourth fisheye camera (for example, 44), which is disposed on the left-side portion of the vehicle and captures a leftward image of the vehicle, by rotating the conversion center position counterclockwise around the imaging center of the fourth fisheye camera.

According to this, it is possible to reduce influence of the orientation change in the front-and-rear direction and accurately acquire peripheral information of a desired area for the fisheye cameras that capture the rightward and leftward images, respectively.

In the control device (for example, 2) according to a fifth aspect, the control unit sets the conversion center position of the first fisheye camera (for example, 41), which is disposed on the front portion of the vehicle and captures the forward image of the vehicle, to a position below a predetermined position (for example, a position when the vehicle is in the horizontal state), based on an orientation change state in which the front portion of the vehicle is moved upward and the rear portion of the vehicle is moved downward (for example, a state of being tilted to the rear side at the time of acceleration).

According to this, it is possible to reduce influence of the orientation change in the front-and-rear direction and accurately acquire peripheral information of a desired area for the fisheye camera that captures the forward image.

In the control device (for example, 2) according to a sixth aspect, the control unit sets the conversion center position of the second fisheye camera (for example, 43), which is disposed on the rear portion of the vehicle and captures the rearward image of the vehicle, to a position above a predetermined position (for example, a position when the vehicle is in the horizontal state), based on an orientation change state in which the front portion of the vehicle is moved upward and the rear portion of the vehicle is moved downward (for example, a state of being tilted to the rear side at the time of acceleration).

According to this, it is possible to reduce influence of the orientation change in the front-and-rear direction and accurately acquire peripheral information of a desired area for the fisheye camera that captures the rearward image.

In the control device (for example, 2) according to a seventh aspect, based on an orientation change state in which the front portion of the vehicle is moved upward and the rear portion of the vehicle is moved downward (state of being tilted to the rear side at the time of acceleration), the control unit corrects the conversion center position of the third fisheye camera (for example, 42), which is disposed on the right-side portion of the vehicle and captures the rightward image of the vehicle, by rotating the conversion center position counterclockwise around the imaging center of the third fisheye camera, and corrects the conversion center position of the fourth fisheye camera (for example, 44), which is disposed on the left-side portion of the vehicle and captures the leftward image of the vehicle, by rotating the conversion center position clockwise around the imaging center of the fourth fisheye camera.

According to this, the conversion center positions of the fisheye cameras on the right and left side portions that are rotationally moved due to the influence of the orientation change in the front-and-rear direction can be corrected to appropriate positions. Therefore, it is possible to accurately acquire peripheral information of a desired area for the fisheye cameras that capture the rightward and leftward images, respectively.

In the control device (for example, 2) according to an eighth aspect, the control unit changes the conversion center position of the third fisheye camera (for example, 42), which is disposed on the right-side portion of the vehicle and captures the rightward image of the vehicle, to a position above a predetermined position (for example, a position when the vehicle is in the horizontal state), based on an orientation change state in which the right portion of the vehicle is moved downward and the left portion of the vehicle is moved upward (when lateral acceleration is generated in the right direction, that is, a state of being tilted to the right side).

According to this, for example, it is possible to correct the influence of the orientation change (being tilted to the right side) of the vehicle at the time of executing the steering operation when the vehicle travels in a left curve and acquire the appropriate rightward image.

In the control device (for example, 2) according to a ninth aspect, the control unit changes the conversion center position of the fourth fisheye camera (for example, 42), which is disposed on the left-side portion of the vehicle and captures the leftward image of the vehicle, to a position below a predetermined position (for example, a position when the vehicle is in the horizontal state), based on an orientation change state in which the right portion of the vehicle is moved downward and the left portion of the vehicle is moved upward (when lateral acceleration is generated in the right direction, that is, a state of being tilted to the right side).

According to this, for example, it is possible to correct the influence of the orientation change (being tilted to the right side) of the vehicle at the time of executing the steering operation when the vehicle travels in a left curve and acquire the appropriate leftward image.

In the control device (for example, 2) according to a tenth aspect, based on an orientation change state in which the right portion of the vehicle is moved downward and the left portion of the vehicle is moved upward (when the lateral acceleration is generated in the right direction, that is, a state of being tilted to the right side), the control unit corrects the conversion center position of the first fisheye camera (for example, 41), which is disposed on the front portion of the vehicle and captures the forward image of the vehicle, by rotating the conversion center position counterclockwise around the imaging center of the first fisheye camera, and corrects the conversion center position of the second fisheye camera (for example, 43), which is disposed on the rear portion of the vehicle and captures the rearward image of the vehicle, by rotating the conversion center position clockwise around the imaging center of the second fisheye camera.

According to this, for example, it is possible to correct the influence of the orientation change (being tilted to the right side) of the vehicle at the time of executing the steering operation when the vehicle travels in a left curve and acquire the appropriate forward and rearward image.

In the control device (for example, 2) according to an eleventh aspect, the control unit changes the conversion center position of the third fisheye camera (for example, 42), which is disposed on the right-side portion of the vehicle and captures the rightward image of the vehicle, to a position below a predetermined position, based on an orientation change state in which the right portion of the vehicle is moved upward and the left portion of the vehicle is moved downward (when the lateral acceleration is generated in the left direction, that is, a state of being tilted to the left side).

According to this, for example, it is possible to correct the influence of the orientation change (being tilted to the left side) of the vehicle at the time of executing the steering operation when the vehicle travels in a right curve and acquire the appropriate rightward image.

In the control device (for example, 2) according to a twelfth aspect, the control unit changes the conversion center position of the fourth fisheye camera (for example, 44), which is disposed on the left-side portion of the vehicle and captures the leftward image of the vehicle, to a position above a predetermined position, based on an orientation change state in which the right portion of the vehicle is moved upward and the left portion of the vehicle is moved downward (when the lateral acceleration is generated in the left direction, that is, a state of being tilted to the left side).

According to this, for example, it is possible to correct the influence of the orientation change (being tilted to the left side) of the vehicle at the time of executing the steering operation when the vehicle travels in a right curve and acquire the appropriate leftward image.

In the control device (for example, 2) according to a thirteenth aspect, based on an orientation change state in which the right portion of the vehicle is moved upward and the left portion of the vehicle is moved downward (when the lateral acceleration is generated in the left direction, that is a state of being tilted to the left side), the control unit corrects the conversion center position of the first fisheye camera (for example, 41), which is disposed on the front portion of the vehicle and captures the forward image of the vehicle, by rotating the conversion center position clockwise around the imaging center of the first fisheye camera, and corrects the conversion center position of the second fisheye camera (for example, 43), which is disposed on the rear portion of the vehicle and captures the rearward image of the vehicle, by rotating the conversion center position counterclockwise around the imaging center of the second fisheye camera.

According to this, for example, it is possible to correct the influence of the orientation change (being tilted to the left side) of the vehicle at the time of executing the steering operation when the vehicle travels in a right curve and acquire the appropriate forward and rearward images.

In the control device (for example, 2) according to a fourteenth aspect, the detection unit detects the orientation of the vehicle based on at least one of the acceleration or the deceleration of the vehicle and the lateral acceleration perpendicular to a traveling direction of the vehicle.

According to this, it is possible to easily detect the orientation of the vehicle, which is changed in the front-and-rear direction and/or the right-and-left direction.

In the control device (for example, 2) according to a fifteenth aspect, the detection unit calculates the lateral acceleration based on a speed of the vehicle and a steering amount of the vehicle.

According to this, the lateral acceleration (acceleration in the right-and-left direction) can be easily acquired.

In the control device (for example, 2) according to a sixteenth aspect, the detection unit detects the orientation of the vehicle by using a gyro sensor (for example, 5).

According to this, it is possible to easily detect the orientation of the vehicle.

According to a seventeenth aspect, there is provided an operation method for a control device (for example, 2) that controls imaging with fisheye cameras (for example, 41 to 44) disposed on front and rear portions and right and left side portions of a vehicle (for example, 1), the operation method including.

detecting an orientation of the vehicle (for example, S601); and controlling a conversion center position (for example, 301, 701, and 751) for converting a fisheye image of each of the fisheye cameras into a planar image based on the orientation of the vehicle (for example, S602).

As a result, it is possible to accurately acquire the peripheral information regarding a desired area regardless of the orientation change of the vehicle. Therefore, various processing such as driving assistance and automated driving using the acquired peripheral information can also be executed with high accuracy.

According to an eighteenth aspect, there is a non-transitory computer-readable storage medium that stores a program causing a computer to function as the control device according to any one of the first to sixteenth aspects.

According to this, the operation of the control device can be realized by the computer.

According to the present invention, it is possible to accurately acquire the peripheral information regarding a desired area regardless of the orientation change of the vehicle. Therefore, various processing such as driving assistance and automated driving using the acquired peripheral information can also be executed with high accuracy.

What is claimed is:

1. A control device that controls imaging with fisheye cameras disposed on front and rear portions and right and left side portions of a vehicle, the control device comprising:
   a detection unit configured to detect an orientation of the vehicle; and
   a control unit configured to control a conversion center position for converting a fisheye image of each of the fisheye cameras into a planar image based on the orientation of the vehicle, and
   wherein the conversion frequency of each of the fisheye cameras disposed on the right and left sides of the vehicle is different from the image conversion frequency of each of the fisheye cameras disposed on the front and rear sides of the vehicle,
   wherein the image conversion frequency of each of the fisheye cameras disposed on the right and left sides of the vehicle is controlled to be lower than the image conversion frequency of each of the fisheye cameras disposed on the front and rear sides of the vehicle.

2. The control device according to claim 1, wherein the control unit sets the conversion center position of a first fisheye camera, which is disposed on the front portion of the vehicle and captures a forward image of the vehicle, to a position above a predetermined position, based on an orientation change state in which the front portion of the vehicle is moved downward and the rear portion of the vehicle is moved upward.

3. The control device according to claim 1, wherein the control unit sets the conversion center position of a second fisheye camera, which is disposed on the rear portion of the vehicle and captures a rearward image of the vehicle, to a position below a predetermined position, based on an orientation change state in which the front portion of the vehicle is moved downward and the rear portion of the vehicle is moved upward.

4. The control device according to claim 1, wherein based on an orientation change state in which the front portion of the vehicle is moved downward and the rear portion of the vehicle is moved upward,
   the control unit corrects the conversion center position of a third fisheye camera, which is disposed on the right-side portion of the vehicle and captures a rightward image of the vehicle, by rotating the conversion center position clockwise around an imaging center of the third fisheye camera, and
   corrects the conversion center position of a fourth fisheye camera, which is disposed on the left-side portion of the vehicle and captures a leftward image of the vehicle, by rotating the conversion center position counterclockwise around the imaging center of the fourth fisheye camera.

5. The control device according to claim 1, wherein the control unit sets the conversion center position of a first fisheye camera, which is disposed on the front portion of the vehicle and captures a forward image of the vehicle, to a position below a predetermined position, based on an orientation change state in which the front portion of the vehicle is moved upward and the rear portion of the vehicle is moved downward.

6. The control device according to claim 1, wherein the control unit sets the conversion center position of a second fisheye camera, which is disposed on the rear portion of the vehicle and captures a rearward image of the vehicle, to a position above a predetermined position, based on an orientation change state in which the front portion of the vehicle is moved upward and the rear portion of the vehicle is moved downward.

7. The control device according to claim 1, wherein based on an orientation change state in which the front portion of the vehicle is moved upward and the rear portion of the vehicle is moved downward,
   the control unit corrects the conversion center position of a third fisheye camera, which is disposed on the right-side portion of the vehicle and captures a rightward image of the vehicle, by rotating the conversion center position counterclockwise around an imaging center of the third fisheye camera, and
   corrects the conversion center position of a fourth fisheye camera, which is disposed on the left-side portion of the vehicle and captures a leftward image of the vehicle, by rotating the conversion center position clockwise around the imaging center of the fourth fisheye camera.

8. The control device according to claim 1, wherein the control unit changes the conversion center position of a third fisheye camera, which is disposed on the right-side portion of the vehicle and captures a rightward image of the vehicle, to a position above a predetermined position, based on an orientation change state in which a right portion of the vehicle is moved downward and a left portion of the vehicle is moved upward.

9. The control device according to claim 1, wherein the control unit changes the conversion center position of a fourth fisheye camera, which is disposed on the left-side portion of the vehicle and captures a leftward image of the vehicle, to a position below a predetermined position, based on an orientation change state in which a right portion of the vehicle is moved downward and a left portion of the vehicle is moved upward.

10. The control device according to claim 1, wherein based on an orientation change state in which a right portion of the vehicle is moved downward and a left portion of the vehicle is moved upward,
    the control unit corrects the conversion center position of a first fisheye camera, which is disposed on the front portion of the vehicle and captures a forward image of the vehicle, by rotating the conversion center position counterclockwise around an imaging center of the first fisheye camera, and
    corrects the conversion center position of a second fisheye camera, which is disposed on the rear portion of the vehicle and captures a rearward image of the vehicle, by rotating the conversion center position clockwise around the imaging center of the second fisheye camera.

11. The control device according to claim 1, wherein the control unit changes the conversion center position of a third fisheye camera, which is disposed on the right-side portion of the vehicle and captures a rightward image of the vehicle, to a position below a predetermined position, based on an orientation change state in which a right portion of the vehicle is moved upward and a left portion of the vehicle is moved downward.

12. The control device according to claim 1, wherein the control unit changes the conversion center position of a fourth fisheye camera, which is disposed on the left-side portion of the vehicle and captures a leftward image of the vehicle, to a position above a predetermined position, based on an orientation change state in which a right portion of the vehicle is moved upward and a left portion of the vehicle is moved downward.

13. The control device according to claim 1, wherein based on an orientation change state in which a right portion of the vehicle is moved upward and a left portion of the vehicle is moved downward, the control unit corrects the conversion center position of a first fisheye camera, which is disposed on the front portion of the vehicle and captures a forward image of the vehicle, by rotating the conversion center position clockwise around an imaging center of the first fisheye camera, and corrects the conversion center position of a second fisheye camera, which is disposed on the rear portion of the vehicle and captures a rearward image of the vehicle, by rotating the conversion center position counterclockwise around the imaging center of the second fisheye camera.

14. An operation method for a control device that controls imaging with fisheye cameras disposed on front and rear portions and right and left side portions of a vehicle, the operation method comprising:

detecting an orientation of the vehicle; and controlling a conversion center position for converting a fisheye image of each of the fisheye cameras into a planar image based on the orientation of the vehicle, and wherein the conversion frequency of each of the fisheye cameras disposed on the right and left sides of the vehicle is different from the image conversion frequency of each of the fisheye cameras disposed on the front and rear sides of the vehicle, wherein the image conversion frequency of each of the fisheye cameras disposed on the right and left sides of the vehicle is controlled to be lower than the image conversion frequency of each of the fisheye cameras disposed on the front and rear sides of the vehicle.

15. A non-transitory computer-readable storage medium that stores a program causing a computer to execute an operation method for a control device that controls imaging with fisheye cameras disposed on front and rear portions and right and left side portions of a vehicle, the operation method comprising:

detecting an orientation of the vehicle; and controlling a conversion center position for converting a fisheye image of each of the fisheye cameras into a planar image based on the orientation of the vehicle, and wherein the conversion frequency of each of the fisheye cameras disposed on the right and left sides of the vehicle is different from the image conversion frequency of each of the fisheye cameras disposed on the front and rear sides of the vehicle, wherein the image conversion frequency of each of the fisheye cameras disposed on the right and left sides of the vehicle is controlled to be lower than the image conversion frequency of each of the fisheye cameras disposed on the front and rear sides of the vehicle.

\* \* \* \* \*